United States Patent
Townsend

[11] 3,885,053
[45] May 20, 1975

[54] METHOD OF FORMING A SKIN SURFACE ON AN EXTRUDED MEAT EMULSION

[75] Inventor: Ray T. Townsend, Des Moines, Iowa

[73] Assignee: Townsend Engineering Company, Des Moines, Iowa

[22] Filed: Aug. 17, 1973

[21] Appl. No.: 389,388

Related U.S. Application Data

[63] Continuation-in-part of Ser. No. 222,088, Jan. 31, 1972, abandoned.

[52] U.S. Cl. ............... 426/276; 426/284; 426/302; 426/364; 426/371; 426/389
[51] Int. Cl. ........................................... A22c 18/00
[58] Field of Search ........... 426/149, 276, 284, 302, 426/371, 389, 412, 364

[56] References Cited
UNITED STATES PATENTS

| | | | |
|---|---|---|---|
| 3,503,756 | 3/1970 | Wistreich | 426/276 |
| 3,622,353 | 11/1971 | Bradshaw et al. | 426/284 |
| 3,698,916 | 10/1972 | Moreland | 426/412 |

Primary Examiner—Hyman Lord
Attorney, Agent, or Firm—Zarley, McKee, Thomte & Voorhees

[57] ABSTRACT

A method and means of forming a skin surface on a meat emulsion is disclosed with the method generally comprising the steps of: (1) conveying the emulsion through an elongated tube; ( ) applying a thin film of an edible acid or other chemical on the outer surface of the emulsion to form a skin or coagulation thereon as it is conveyed through the elongated tube. The apparatus of this invention comprises a mounting lug having a long stuffing tube extending therefrom. An inlet conduit is in communication with the forward end of the tube and the acid or the like is preferably passed through a sintered sleeve provided adjacent the forward end of the tube to apply the thin film on the emulsion. The tube has a length which is sufficient to allow time for the acid to act on the emulsion to form the skin or coagulation thereon. The cylindrical shape of the elongated tube confines the emulsion in the desired shape and cooperates with the acid to form a smooth surface on the emulsion.

3 Claims, 7 Drawing Figures

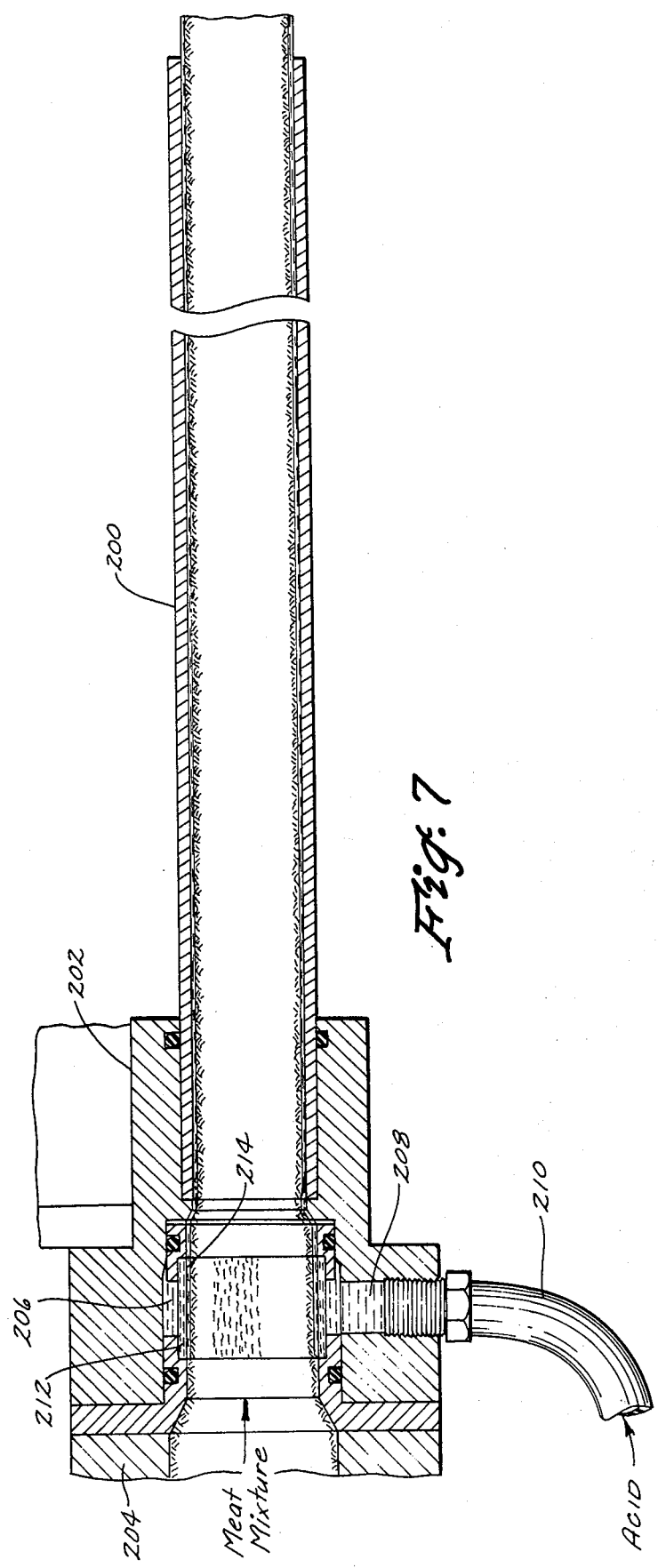

METHOD OF FORMING A SKIN SURFACE ON AN EXTRUDED MEAT EMULSION

This application is a continuation in part of application Ser. No. 222,088 filed Jan. 31, 1972, now abandoned.

BACKGROUND OF THE INVENTION

Said application Ser. No. 222,088 disclosed a method and means of conveying plastic materials through a conduit in which is created a lubricating film between the emulsion and the stuffing horn or tube to prevent meat damage or smear. The apparatus of said application satisfactorily solved the problems of meat damage and smear. It has been discovered that the modified form of the apparatus and method disclosed in said application may be employed to create a skin or coagulation on the surfaces of a meat product.

This invention relates to the preparation of "skinless" meat products such as frankfurters, smoked or unsmoked sausage links, and the like. U.S. Pat. No. 3,503,756 discloses the method of producing sausage products without the use of casings by extruding the meat emulsion to give it an appropriate shape and contacting the extrudate while it is without physical support with an hot edible aqueous acid solution to form a cohesive surface layer. More particularly, the disclosure in the U.S. Pat. No. 3,503,756 teaches that the frankfurters or the like are conveyed through a bath solution of the edible aqueous acid so that the proteins at the periphery of the extruded emulsion are denatured to form a cohesive surface. The method disclosed in said patent required that the frankfurters or the like be immersed and conveyed through an acid solution resulting in an operation which is inefficient and time consuming and provides a rough, unattractive surface.

Therefore, it is a principal object of the invention to provide a method and means of forming a cohesive surface layer on a meat product.

A further object of the invention is to provide an improved method and means of forming a skin surface on an emulsion.

A further object of the invention is to provide a method and means of forming a skin surface on an emulsion which results in a smooth surface being provided.

A further object of the invention is to provide a method and means of forming a skin surface on an emulsion which is economical in manufacture.

These and other object will be apparent to those skilled in the art.

BRIEF DESCRIPTION OF THE DRAWINGS

This invention consists in the construction, arrangement and combination of the various parts of the device and in the sequence of steps of the method, whereby the objects contemplated are attained as hereinafter more fully set forth, specifically pointed out in the claims, and illustrated in the accompanying drawings, in which:

FIG. 7 is a sectional view similar to FIG. 6 except that a still further modified form of the invention is disclosed.

DESCRIPTION OF THE PREFERRED EMBODIMENT

FIGS. 1 – 6 are identical to the drawings disclosed in the said co-pending application. FIGS. 1 – 6 illustrate apparatus which is intended to supply a thin lubricating film between the interior surface of the stuffing tube and the exterior surface of the meat emulsion. FIGS. 1 – 6 illustrate apparatus which is primarily intended to be used for the stuffing of the meat product into casings or the like. The instant invention relates to the production of sausages, franks and the like of the skinless type. The apparatus disclosed in FIGS. 1 – 6 may be employed in the instant invention with some modification thereof as will be explained hereinafter. It is therefore to be understood that the employment of casings although shown in some of the Figures does not form a part of the invention of this application. This fact will become more apparent from the following description.

Figure 1:
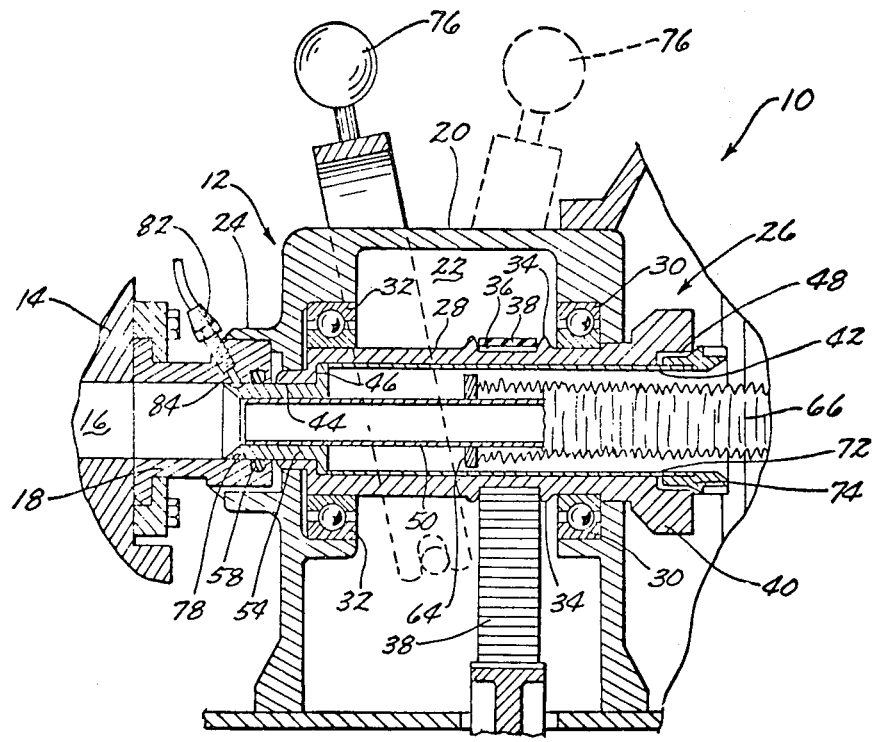
FIG. 1 is a partial sectional view taken through a portion of an apparatus for encasing the meat product.
Figure 2:
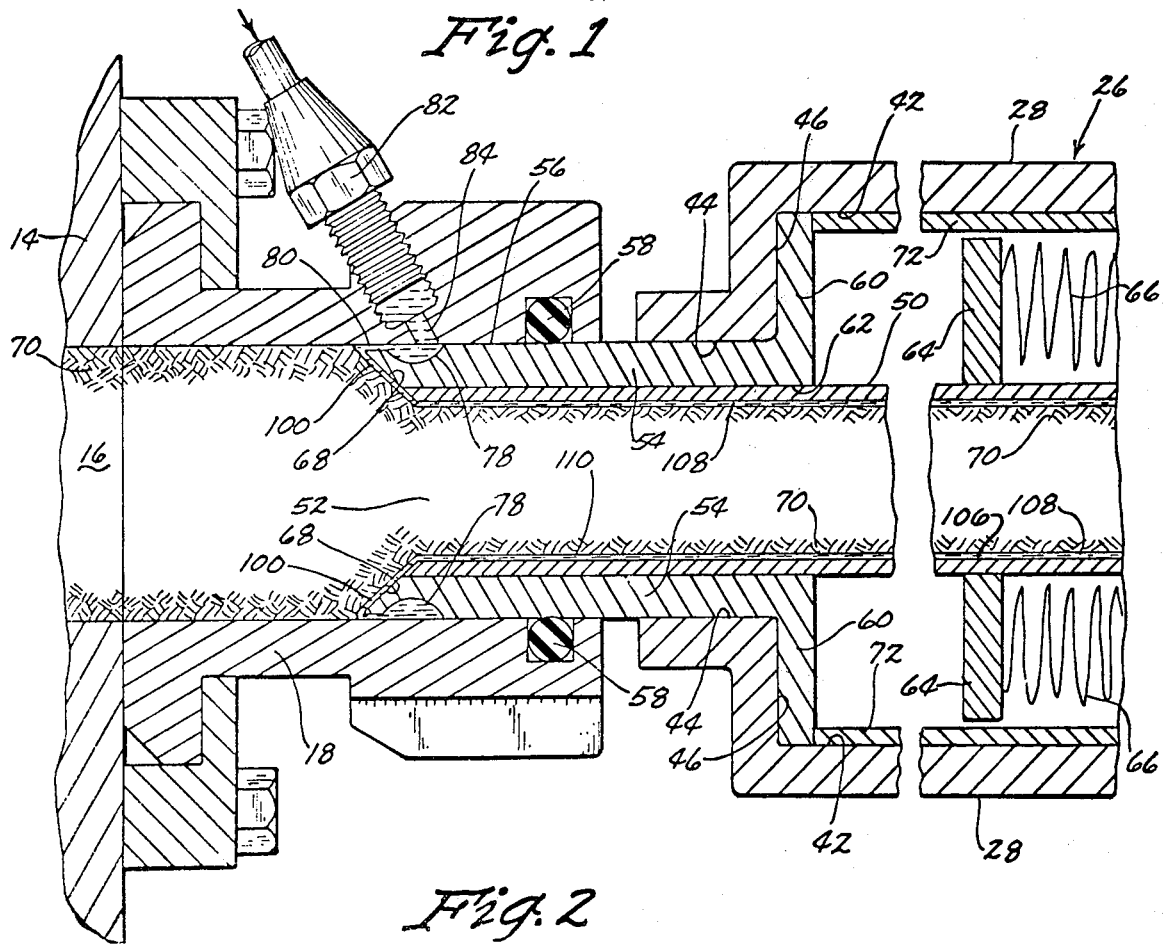
FIG. 2 is an enlarged sectional view of a portion of the apparatus for encasing the meat product.

With respect to FIGS. 1 and 2, the numeral 10 refers generally to an apparatus for encasing a product so as to produce sausages, franks and the like. It can however be easily modified to prepare skinless products of the type described in this invention. Apparatus 10 includes a casing filling machine 12 and would normally include a linking apparatus, looping apparatus and support cabinet, which have not been shown.

Casing filling machine 12 includes a product pump 14 which is adapted to pump products of plastic consistency. Product pumps of this type are known in the art and therefore further description of pump 14 is unnecessary other than to state that it includes an inlet adapted to be connected to a conduit leading from a supply of plastic product and further includes an outlet 16 through which the product is pumped. Operatively secured over outlet 16 is a connecting conduit 18 which is adapted to receive the plastic product being pumped through outlet 16. The utility of this invention is not limited to the use of a pump, for the invention is useful even in stuffing by hand.

A spindle housing 20 includes a chamber 22 therein and further includes an inlet coupling 24 adapted for retentively receiving connecting conduit 18 therein. Rotatably mounted within housing 20 is a spindle assembly 26 which includes spindle tube 28. Spindle tube 28 is rotatably journaled in housing 20 by means of front and rear bearings 30 and 32, respectively. Spindle tube 28 includes a belt receiving track 34 on its outer surface which has a plurality of small teeth 36 adapted to engage teeth on the interior surface of a drive belt 38 which is trained around track 34. Spindle tube 28 is provided with a head 40 adjacent its forward end and has an elongated bore 42 extending therethrough. Bore 42 has a minor bore 44 adjacent its rearward end which has a diameter slightly less than bore 42 to present an annular shoulder 46 therebetween. Bore 42 is also provided with a threaded portion 48 at its forward end.

Rigidly mounted within spindle tube 28 is a stuffing tube 50 having an intake opening 52 at its rearward end and a discharge opening (not shown) at its forward end. The rearward end of stuffing tube 50 is press fitted or otherwise rigidly mounted within a cylindrical mounting lug 54. Mounting lug 54 includes a cylindrical outer surface 56 which is adapted to slidably fit within minor bore 44 of spindle tube 28 and protrude axially outwardly therefrom into connecting conduit 18. A sealing ring 58 on the interior of conduit 18 provides sealing between the interior of conduit 18 and the exterior surface 56 of mounting lug 54 so that mounting lug 54 can rotate within conduit 18 and simultaneously be sealed therein. Mounting lug 54 includes an annular rim flange 60 which is adapted to abut against shoulder 46 so as to limit the rearward movement of lug 54 within spindle tube 28. Lug 54 includes a tube receiving bore 62 extending therethrough for receiving stuffing tube 50 with a press fit so that stuffing tube 50 and mounting lug 54 are rigidly secured to one another. Casing follower 64 is slidably mounted on stuffing tube 50 for following the casing 66 where casing is employed. Adjacent the rearward end of tube receiving bore 62 is a beveled funnel-like opening 68 which is in communication with the interior of connecting conduit 18 so as to permit passage of plastic product 70 from outlet 16 of pump 14, through connecting conduit 18 and into the interior of stuffing tube 50.

Mounting lug 54 is rigidly secured within the spindle tube 28 by means of locking cylinder 72. Locking cylinder 72 includes a threaded head 74 adapted to be threadably retained within threaded portion 48 of elongated bore 42. Locking cylinder 72 extends rearwardly within the spindle tube 28 and at its rearward end engages annular rim flange 60 of mounting lug 54 thereby pressing it against the shoulder 46 of spindle tube 28. Thus, mounting lug 54 and stuffing tube 50 are rigidly mounted within spindle tube 28 so that rotation of spindle tube 28 causes mounting lug 54 and stuffing tube 50 to rotate in unison therewith. Suitable power means is connected to drive belt 38 for rotating spindle assembly 26. Spindle handle 76 is provided on control operations for functions not related to the instant invention.

An arcuate, annular channel 78 is formed in the exterior surface 56 of mounting lug 54 forwardly of the rearward end thereof as illustrated in FIG. 2. The extreme rearward end of mounting lug 54 has a reduced outside diameter portion to provide an annular passageway 80 which extends rearwardly from channel 78 to the rearward end of mounting lug 54. A fluid inlet coupling 82 is threadably mounted on conduit 18 and is in communication with inlet port 84 extending through conduit 18 as shown in FIG. 2. Inlet coupling 82 is in communication with a source of fluid under predetermined pressure for supplying the fluid, such as water, to the port 84, channel 78 and passageway 80.

The foregoing description relating to FIGS. 1 – 2 pertained generally to an apparatus for encasing a product in the casing 66. It is particularly suited for the invention of my parent application Ser. No. 222,088 filed Jan. 31, 1972. The apparatus of FIGS. 1 and 2 can easily be modified for use with the present invention by simply eliminating the casing follower 64 and the casing 66. The stuffing tube 50 would be modified so as to increase the length thereof to any desired length. In the present invention, the inlet coupling 82 would be placed in communication with a source of fluid under predetermined pressure for supplying the fluid, such as edible acid, chemicals, liquid smoke material, etc. as will be explained in more detail hereinafter.

Figures 3, 4:
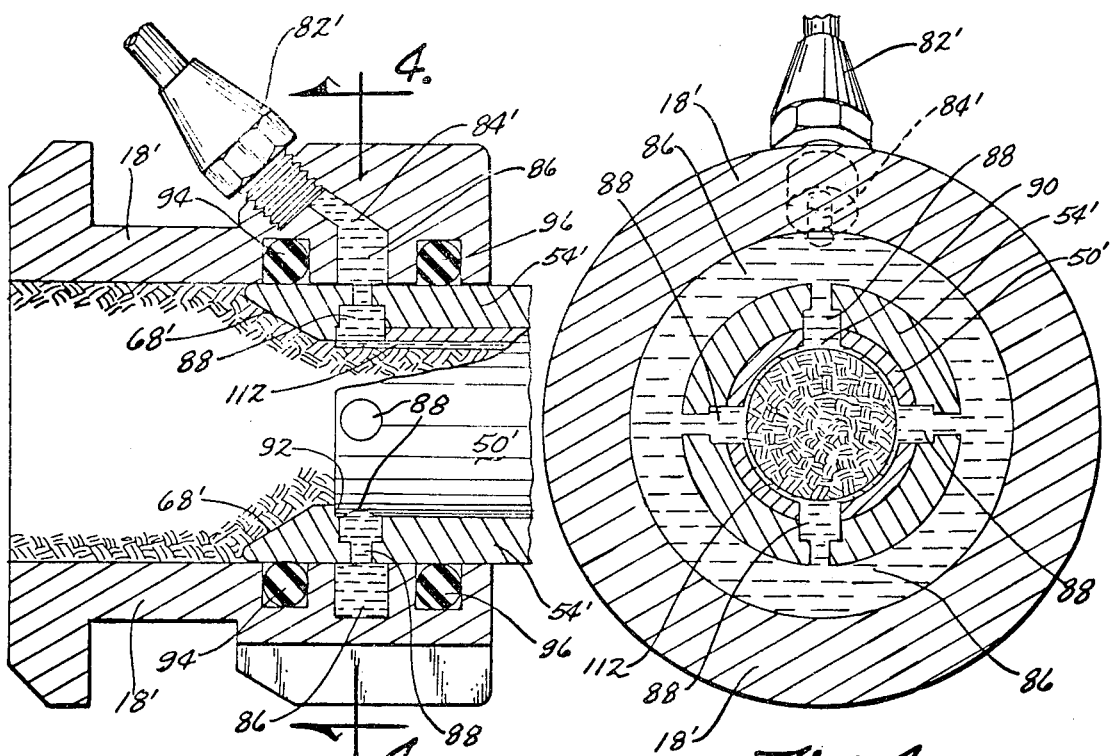
FIG. 3 is a sectional view similar to FIG. 2 except that a modified form of the invention is illustrated.
FIG. 4 is a sectional view seen along lines 4 — 4 of FIG. 3.

A modified form of the apparatus of FIGS. 1–2 is illustrated in FIGS. 3 and 4. Inlet coupling 82' is in communication with an inlet port 84' formed in conduit 18'. Conduit 18' has an annular channel or groove 86 formed therein extending outwardly from the interior of conduit 18' as seen in FIGS. 3 and 4. Channel 86 is in communication with port 84'. Mounting lug 54' has a plurality of spaced apart bores 88 formed therein extending therethrough forwardly of its rearward end which communicate with channel 86. As seen in FIGS. 3 and 4, the bores 88 have reduced diameter portions at their outer ends. As seen in FIG. 4, the rearward end of stuffing tube 50' does not extend all the way to the funnel-like opening 68' formed in mounting lug 54' but terminates short of a shoulder 92 formed in mounting lug 54 for a purpose to be described in detail hereinafter. Seals 94 and 96 are provided in conduit 18' on opposite sides of channel 86 to prevent the escape of fluid outwardly between the mating surfaces of conduit 18' and mounting lug 54'.

Figures 5, 6:
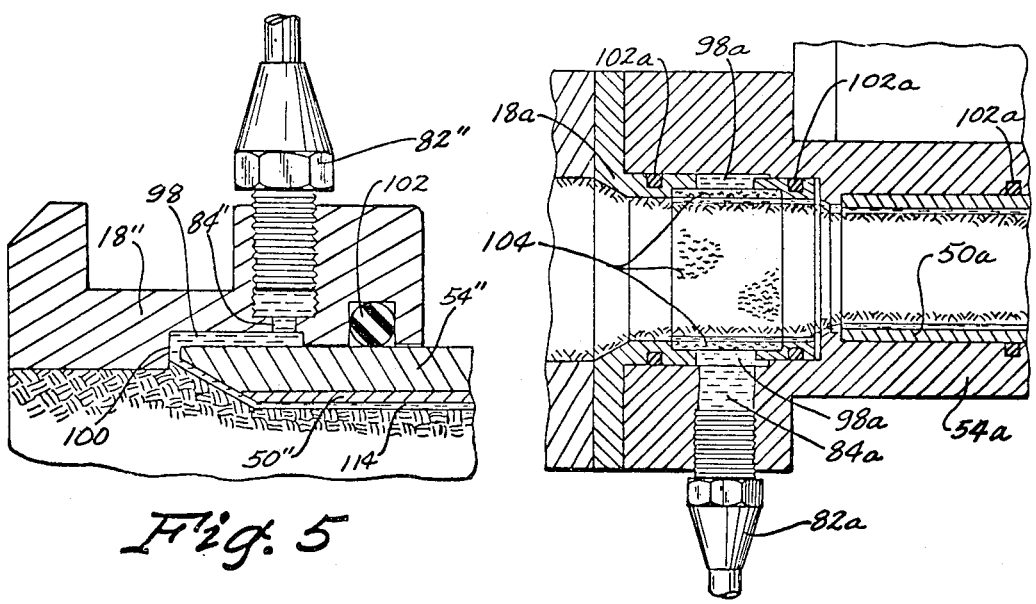
FIG. 5 is a sectional view similar to FIG. 4 except that a still further modified form of the invention is disclosed.
FIG. 6 is a sectional view similar to FIG. 4, except that a still further modified form of the invention is disclosed.

A still further modified form of the invention is shown in FIG. 5. Inlet conduit 82'' communicates with port 84'' formed in conduit 18''. An annular channel 98 is formed in the interior surface of conduit 18'' and communicates with port 84''. The rearward end of channel 98 is defined by an annular shoulder 100 which extends transversely inwardly therefrom. As seen in FIG. 5, the inner end of shoulder 100 terminates inwardly of the outer rearward end of mounting lug 54''. In FIG. 5, the numeral 50'' refers to a stuffing tube identical to that shown in FIGS. 1 and 2. Seal 102 is provided in conduit 18'' for the same purposes as seal 58 in FIGS. 1 and 2.

A still further modified form of the invention is shown in FIG. 6. Inlet conduit 82a communicates with port 84a formed in conduit 18a. An annular channel 98a is formed in the interior surface of conduit 18a and communicates with port 84a. The numeral 54a is a mounting lug which receives stuffing tube 50a. Seal 102a is provided in conduit 18a to serve the same purpose as seal 102 in FIG. 5.

A cylindrical restricting meter or filter means 104 is positioned coextensively with channel 98a. Means 104 may be comprised of sintered metal having openings preferably from ½ to 2 microns in size, and preferably not larger than 4 or 5 microns. The means 104 permits the lubricating phenomena to take place with a 2 to 5 pound pressure differential between fluid and emulsion. Furthermore, there will be no back-up of the emulsion through the filter even if the water pressure was shut off. While it is preferred that the cylindrical means 104 be comprised of sintered metal, this fact is not critical. Other suitable sintered filters such as porcelain, other clay material based filters, and some durable sintered glass filters may also be employed.

The devices illustrated in FIGS. 3, 4, 5 and 6 may be modified for the present invention by simply eliminating the casing followers and casings employed therewith and to provide an elongated stuffing tube preferably having an approximate length of 8 feet. The fluid employed with the devices of FIGS. 3, 4, 5 and 6 would be the edible acid of the like as described herein.

The preferred apparatus of the invention is illustrated in FIG. 7 and can be seen to be very similar to that illustrated in FIG. 6. The primary difference between the apparatus of FIG. 7 and the apparatus shown in FIG. 6 is that the tube 50a has been replaced by a tube 200 having an approximate length of eight feet or longer. The tube 200 is mounted in a mounting lug 202 having a conduit 204 provided at its rearward end. An arcuate channel 206 is formed in the interior surface of conduit 204 and communicates with port 208 formed in the mounting lug 202. Inlet conduit 210 communicates with the port 208. Inlet conduit 204 is provided with a recessed channel 212 formed therein which received a sintered, preferably metal, sleeve having openings preferably from ½ to 2 microns in size. As seen in FIG. 7, sleeve 210 is positioned coextensively with the channel 206.

In all of the description hereinafter, the term acid will be used to designate the fluid that is being supplied to the exterior surface of the emulsion but it should be understood that the acid could be comprised of acid, liquid smoke, curing chemicals, water, etc. The acid may be of the composition disclosed in U.S. Pat. No. 3,503,756, whose acid disclosure is incorporated herein by reference, such as acetic acid, ascorbic acid, citric acid, fumaric acid, malic acid, hydrochloric acid, phosphoric acid, etc. Any suitable acid material which will provide some lubricating properties and which will react with the protein material of the product being prepared to form of cohesive skin like surface thereon is suitable. Both organic and inorganic edible acid materials can be employed.

The operation of the machine illustrated in FIGS. 1 and 2 is as follows. Prior to activating the apparatus, the source of fluid (acid) pressure in communication with coupling 82 is activated so as to supply acid thereto under pressure preferably of approximately 100 pounds per square inch. The apparatus is then activated with the meat pump preferably applying pressure to the meat of approximately 30 pounds per square inch. Activation of the apparatus causes the meat product to be pumped from the outlet 16, through conduit 18 and into the rearward end of the stuffing tube 50. FIG. 2 illustrates the path which the acid takes as it is pumped into the conduit 18. The acid forms a cohesive skin surface on the exterior of the meat product, believed to be caused by protein denaturing the emulsion protein, as it is being pumped through the elongated stuffing tube. It is recommended that water also be used in conjunction with the edible acid so as to provide the necessary lubrication between the exterior of the meat emulsion and the interior surface of the stuffing tube to permit the meat emulsion to be pumped through the long stuffing tube without the customary wadding effect taking place. The stuffing tube must have a length sufficient to keep the emulsion confined in the desired cylindrical shape for a sufficient period of time to allow the formation of the surface skin. If desired, liquid smoke or other possible additional chemicals could be employed in the fluid in order to cure or partially cure the emulsion while it is confined in the tube and passing therethrough.

The passageway 80 is preferably formed so that a clearance of .001 inch is present between the interior wall surface of conduit 18 and the rearward end of the mounting lug 54. The acid is forced rearwardly from the rearward end of the passageway 80 and engages the advancing meat product which is generally referred to by the reference numeral 70. The acid forms a lubricating film between the meat product and the rearward end of the mounting lug 54 as illustrated in FIG. 2 and is generally referred to by the reference numeral 106. As the product advances, the acid creates a continuous film in intimate contact with the interior surface 108 of the tube 50 and the exterior surface of the meat product being pumped therethrough. The film of acid between the product and tube 50 is referred to generally by the reference numeral 110. In FIGS. 1 and 2 mounting lug 54 and stuffing tube 50 are being rotated with respect to the meat product to insure that the acid will be introduced between the confining surfaces and the meat product in a uniform and continuous film so as to achieve the desired lubricating qualities and so as to achieve the desired reaction of the acid and the meat product; however, the desirable results of this invention can also be achieved without rotating the mounting lug 54 and the stuffing tube 50, with respect to the meat product. It is important that the acid be introduced under pressure completely around the mounting lug 54 and this is achieved by the annular channel 78.

The apparatus of FIGS. 3 and 4 generally achieves the same end result as the apparatus of FIGS. 1 and 2. The apparatus of FIGS. 3 and 4 does introduce the film of acid between the meat product and the interior of the tube and such film is generally referred to by the reference numeral 112. The annular shoulder 92 aids in directing the acid forwardly into the interior of the tube 50' as the meat product is being pumped therethrough. Likewise, the embodiment of FIG. 5 also introduces the acid film between the meat product and the confining surfaces and such film is generally referred to by the reference numeral 114. The shoulder 100 tends to aid in directing the film of acid forwardly towards the tube 50. The device of FIG. 6 lowers the pressure differential between the acid and the emulsion at the point of injection, and eliminates any back-up of emulsion into the acid line. The filter 104 provides an even flow of acid and eliminates the necessity of rotating the stuffing tube 50a.

The preferred embodiment is illustrated in FIG. 7 as previously described. The meat mixture is pumped into the interior of conduit 204 and pumped through the sintered, preferably metal, sleeve 214 into the interior of the elongated tube 200. The acid is supplied to the channel 206 by the conduit 210 with the sintered sleeve 214 allowing the acid to weep a thin film onto the outside surface of the meat product. The acid or other chemical reacts with the meat product to form the cohesive skin surface thereon as it is being moved through the elongated tube 200. The acid and the tube 200 cooperate to form a smooth surface on the exterior of the meat product since the tube 200 maintains the meat product in the desired cylindrical shape as the acid is reacting with the meat product. The thin film of acid on the exterior surface of the meat product and the engagement of the meat product with the interior surface of the tube 200 creates a superior smooth surface heretofore not possible and eliminates the need for total immersion in an acid solution as well as the ineffeciencies resulting from such an immersion process.

While the method of this invention, for purposes of clarity of description, has generally been described with reference to "meat emulsions" it should be understood that it is equally applicable to animal and vegtable protein containing emulsions, or emulsion-like materials, plastic like in character, capable of being molded and of reacting with the acids described herein to provide a cohesive, skin like surface. For example, fish or poultry based emulsions or emulsions of vegetable proteins can be employed.

Thus it can be seen that the method and means accomplishes at least all of its stated objectives.

I claim:

1. A method of forming a skin surface on an extruded edible protein emulsion selected from a group consisting of meat, vegtable, fish and poultry, comprising the steps of: introducing the emulsion into a tube having a substantially continuous interior wall, extruding the emulsion from said tube by subjecting said emulsion to pressure to move said emulsion through said tube, introducing a film of an edible acid solution into said tube in intimate contact with said interior wall and the outer surface of said emulsion whereby said edible acid solution will serve as a lubricant between said emulsion and said interior wall and whereby said edible acid solution reacts with said emulsion while said emulsion is confined within said tube to form a cohesive skin surface thereon as said emulsion is moved through said tube.

2. The method of claim 1 wherein said film is introduced into said tube while at least a portion of said tube is being rotated.

3. The method of claim 1 wherein said edible acid solution contains a liquid smoke.

* * * * *